(12) United States Patent
Parsell, Jr. et al.

(10) Patent No.: US 11,597,529 B2
(45) Date of Patent: Mar. 7, 2023

(54) SAFETY HOOK LATCH

(71) Applicant: QRP, Inc., Leland, NC (US)

(72) Inventors: Michael J. Parsell, Jr., Wilmington, NC (US); Andres Hernandez, Kent, WA (US)

( * ) Notice: Subject to any disclaimer, the term of this patent is extended or adjusted under 35 U.S.C. 154(b) by 909 days.

(21) Appl. No.: 15/268,613

(22) Filed: Sep. 18, 2016

(65) Prior Publication Data
US 2017/0101811 A1 Apr. 13, 2017

Related U.S. Application Data

(63) Continuation-in-part of application No. 14/733,412, filed on Jun. 8, 2015, now Pat. No. 10,173,782, which
(Continued)

(51) Int. Cl.
| E05C 19/10 | (2006.01) |
| E05C 19/14 | (2006.01) |
| B64D 29/06 | (2006.01) |

(52) U.S. Cl.
CPC ............ B64D 29/06 (2013.01); E05C 19/145 (2013.01); *Y10T 292/0946* (2015.04)

(58) Field of Classification Search
CPC ............... Y10T 292/216; Y10S 292/49; E05B 15/0086; E05C 19/14; E05C 19/145
See application file for complete search history.

(56) References Cited

U.S. PATENT DOCUMENTS 2,703,431 A * 3/1955 Tatom .................. E05C 19/145
16/258
2,904,141 A * 9/1959 Henrichs ................ B64D 29/06
292/108
(Continued)

FOREIGN PATENT DOCUMENTS

| EP | 0206648 | 12/1986 | |
| FR | 981093 A * | 5/1951 | ........... E05C 19/145 |
| WO | WO 2009/009732 | 1/2009 | |

OTHER PUBLICATIONS

Translation of the first Office Action from China. 201680046571.6, dated Nov. 15, 2018.
(Continued)

Primary Examiner — Carlos Lugo
(74) Attorney, Agent, or Firm — Ryder, Mazzeo & Konieczny LLC; Joseph M. Konieczny, Sr.

(57) ABSTRACT

A latch for releasably connecting two elements is operable between engaged and released positions. An elongate handle opens and closes a latch mechanism about a first axis of rotation at the rear end of the handle. The latch handle is held closed only when the latch mechanism is in the engaged position and is lockable in the closed position by a manually operable handle catch. The front end of a handle cover is rotatably connected to the front end of the handle. The cover has a cover catch on the rear end, which is engagable with the latch mechanism to hold the cover closed. The cover is substantially coextensive with and in abutment with the handle. When the latch is mounted overhead and is open, the handle extends downward by the force of gravity and the cover extends downward away from the handle. In this configuration, the open latch is highly visible.

19 Claims, 10 Drawing Sheets

Related U.S. Application Data is a continuation-in-part of application No. 14/657,373, filed on Mar. 13, 2015, now abandoned.

(60) Provisional application No. 61/952,521, filed on Mar. 13, 2014.

(56) References Cited

U.S. PATENT DOCUMENTS

| | | | |
|---|---|---|---|
| 4,053,177 A | 10/1977 | Stammreich et al. | |
| 4,743,052 A | 5/1988 | Stammreich et al. | |
| 4,768,815 A * | 9/1988 | Harmon | E05C 19/145 292/113 |
| 4,858,970 A * | 8/1989 | Tedesco | E05C 19/145 292/113 |
| 5,213,286 A * | 5/1993 | Elliott | B64D 29/06 16/368 |
| 5,295,604 A * | 3/1994 | Van Ryswyk | B65D 45/345 220/321 |
| 5,620,212 A | 4/1997 | Bourne et al. | |
| 5,984,382 A * | 11/1999 | Bourne | B64D 29/06 292/113 |
| 6,036,238 A * | 3/2000 | Lallament | B64D 29/06 292/100 |
| 6,279,971 B1 | 8/2001 | Dessenberger | |
| 6,325,428 B1 * | 12/2001 | Do | B64D 29/06 244/129.4 |
| 6,343,815 B1 * | 2/2002 | Poe | E05C 19/145 292/113 |
| 7,461,871 B2 * | 12/2008 | Vauchel | E05C 19/145 292/DIG. 31 |
| 7,988,208 B2 * | 8/2011 | Zugaza Fernandez | E05B 83/10 292/256 |
| 9,452,845 B2 * | 9/2016 | Renault | B64D 29/06 |
| 10,137,996 B2 * | 11/2018 | Mellor | B64D 29/06 |
| 10,173,782 B2 * | 1/2019 | Hernandez | B64D 29/06 |
| 2006/0214431 A1 * | 9/2006 | Helsley | B64D 29/06 292/113 |
| 2008/0129056 A1 | 6/2008 | Hernandez et al. | |
| 2010/0026482 A1 | 2/2010 | Grichener | |

OTHER PUBLICATIONS

International Search Report and Written Opinion of the International Search Authority, PCT/US16/36446, dated Sep. 9, 2016.
International Search Report and Written Opinion of the International Searching Authority. PCT/US17/51980 dated Dec. 1, 2017.
EPO, European Search Report, dated Nov. 18, 2015, Publisher: European Patent Office, Published in: European Patent Office.

* cited by examiner

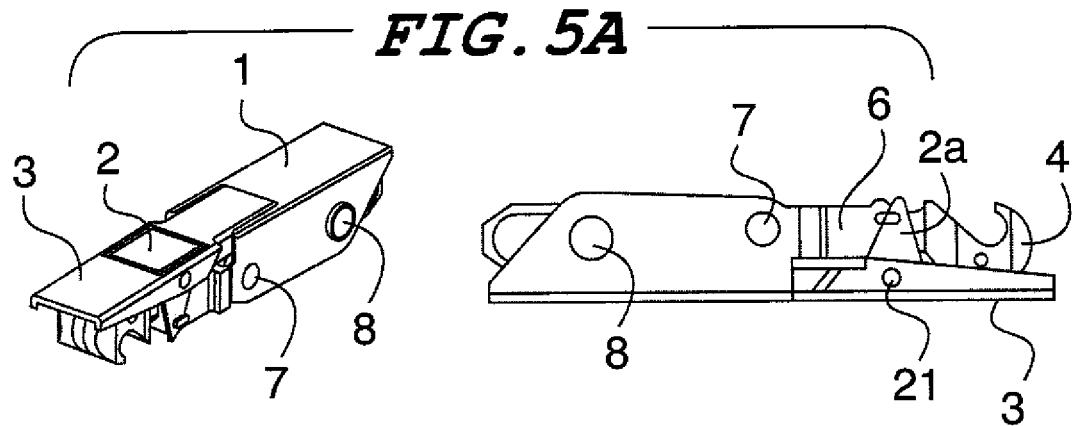
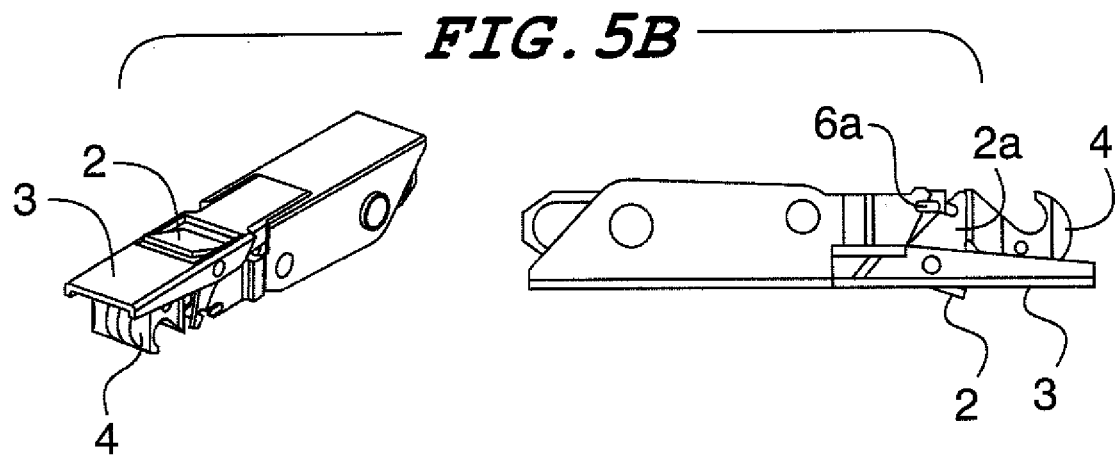
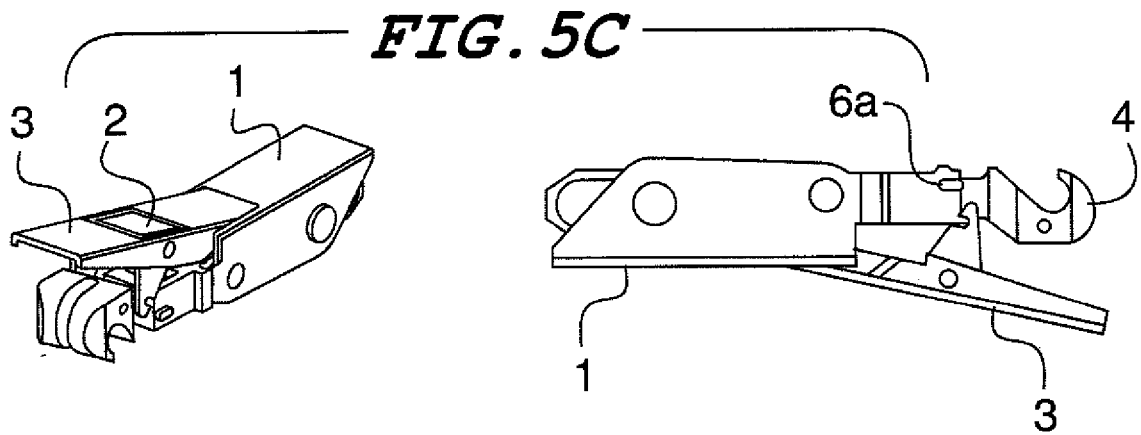

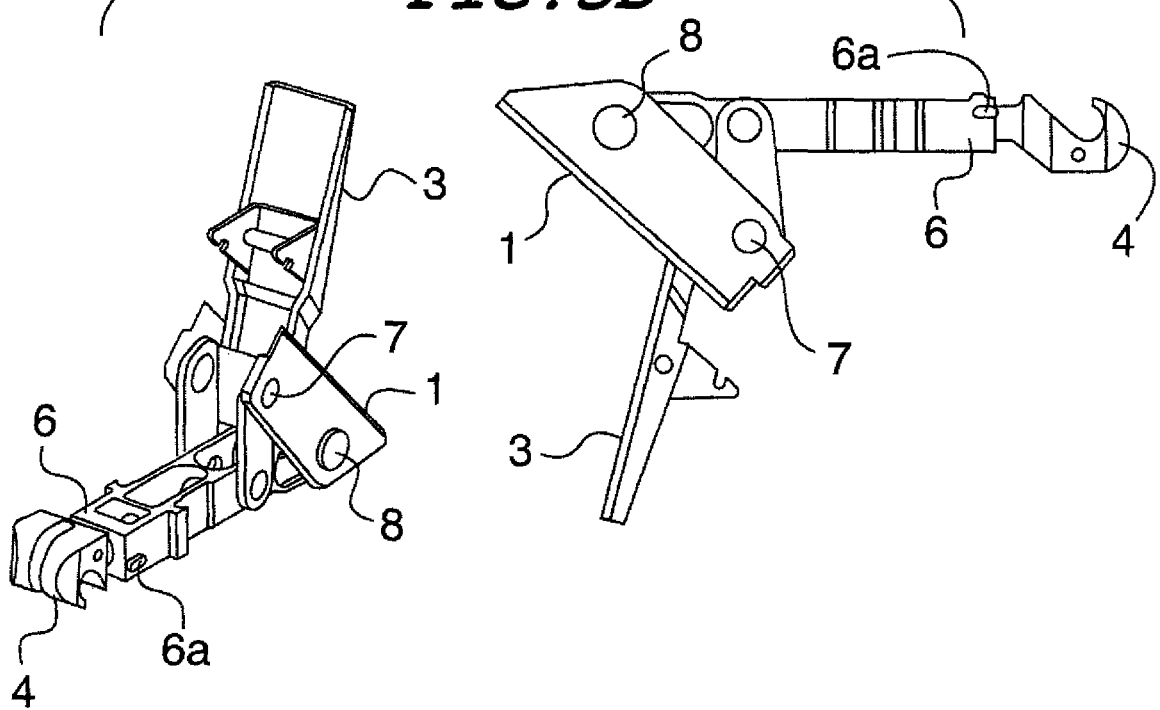
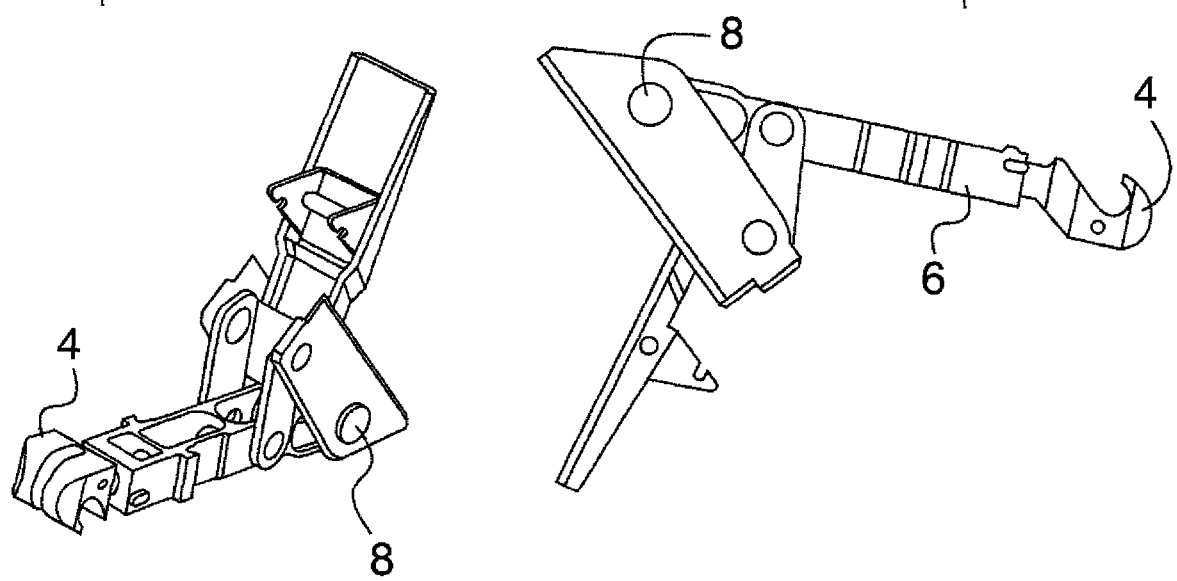

SAFETY HOOK LATCH

CROSS-REFERENCE TO RELATED APPLICATIONS

This is a continuation-in-part application of U.S. application Ser. No. 14/733,412 filed Jun. 8, 2015 entitled "Toggle Link Latch", which is continuation-in-part of U.S. patent application Ser. No. 14/657,373 filed Mar. 13, 2015 entitled "Toggle Link Latch", which is a non-provisional patent application of provisional application No. 61/952,521 filed Mar. 13, 2014 entitled "Toggle Link Latch", priority from all of which is hereby claimed.

FIELD OF THE INVENTION

The present invention relates to a cinch latch, which connects a first structural element to a keeper on a second structural element. More specifically, the invention relates to aircraft panel latches having a hook and an over-center locking linkage.

BACKGROUND OF THE INVENTION

A wide variety of latching mechanisms for use in aircraft exists in the prior art because aircraft have many components, such as fuselage panels including cowlings and the like, which must be opened and closed very securely. For example, tension latches mounted on one panel cinch to a keeper on a second panel to hold the movable panels closed. Other latches include sliding toggle linkages to minimize the kinematic envelope of the latch. These linkages rotate around a mounting pin to produce the latch reach. The complexity of quality aircraft latches makes them relatively large and heavy. Since every component of an aircraft should be as light as possible, it would be desirable to provide a quality latch having a reduced size and weight compared to the prior art.

To reduce weight, aircraft panels are relatively thin, which translates to an associated reduction in sturdiness. As a result, the aircraft panels, and other structures to which the above-described latches are attached, are delicate and can be easily damaged. For example, with some prior art latches, the free end of an open latch may obstruct an opening defined by a movable panel for which the latch is provided. Therefore, when closing the movable panel, it may strike the latch and be damaged if the latch is not properly retracted. This problem is often encountered with open overhead panels where gravity biases the latch assembly in the closed direction, thereby orienting the hook in an extended position pointing upwardly. This configuration occurs if the center of gravity of the latch is "behind" (in the direction away from the hook) the pivot point of the panel-mounting pin. If this occurs, the hook end of the latch could be jammed against the edge of the mating substructure if the latch is not first pulled away before attempting to close the panel. This weight distribution problem is often solved by adding "dead" weight to the hook end of the latch so that it hangs downward, away from the opening, and out of the path of the articulating panel. However, this solution contradicts the salient aircraft design consideration of weight reduction. Therefore, it is desirable to provide a latch that reduces the risk of accidental damage to the surrounding aircraft structures to which it is attached.

Another limitation of prior art latches is possible inadvertent opening of the latch by unexpected contact. The above-described latches most often utilize a push-in, trigger-actuated release mechanism for ease of use. Accidental contact with the trigger, such as being hit by an object while in flight, can open the latch. Furthermore, the location of the latch is not easily seen by inspection personnel so that a latch that is not properly closed can go undetected.

Many of the above-described hook latches do not have a safety measure that enables an inspector to visually confirm that the latch is properly closed. Many prior art hook latches also don't have a safety measure that denies access to the trigger release mechanism of the latch to prevent accidental latch release by maintenance personnel or objects that may impact the aircraft during flight. Therefore, it is desirable to provide a latch having the aforementioned safety measures.

SUMMARY OF THE INVENTION

The invention comprises a latch mechanism with an arrangement of components that places the center of gravity of the mechanism in front of the mounting pin. Therefore, in applications where the latch swings in the vertical plane, the hook will necessarily hang downward away from the keeper when the latch is opened without the need for adding dead weight. This functionality has been achieved in part by locating the mounting pin slot at the very end of the latch arm and arranging the toggle linkage so that the linkage-to-hook pivot joint is on the body of the latch arm in front of the mounting pin.

The latch includes a unique nesting toggle linkage that minimizes overall latch volume. Each link of the linkage has a U-shaped lateral cross section with a central channel that receives the other link when the latch is closed. Furthermore, the links fold toward each other instead of away from each other while closing, which reduces the latch's overall length when fully closed. The latch may include a keeper detector, which prevents the actuation handle from closing if the keeper is not captured by the hook. The keeper detector helps prevent unsuccessful latching and provides a visual indication when a panel is closed but the keeper is not engaged.

In one preferred embodiment, the invention comprises a tension hook latch that applies closing tension between two objects such as a latch mounting pin and a keeper engaged by a hook which extends from one end of the latch. This type of latch is often called a "cinch-up latch" or a "pull-in latch". In one embodiment, the invention comprises a toggle link latch mechanism with an arrangement of components that places the center of gravity of the mechanism in front of the mounting pin. Therefore, in overhead applications where the latch swings in the vertical plane, the hook will necessarily hang downward away from the keeper when the latch is opened without the need for adding dead weight. This functionality has been achieved in part by locating the mounting pin slot at the very end of the latch arm and arranging the toggle linkage so that the linkage-to-hook pivot joint is on the body of the latch arm in front of the mounting pin.

The invention also may include a handle safety cover affixed at one end to the front of the handle that extends the length of the handle. The other end of the cover is releasably attached to the toggle linkage. The safety cover prevents access to a trigger mechanism which releases the latch handle from a locked closed position. The invention further may include a sensor, which detects the absence of the keeper in the hook to disable the handle from locking in the closed position when the hook is not occupied by the keeper.

More specifically, the novel tension latch has a latch mechanism for releasably connecting two elements, which is operable between engaged and released positions. The rear end of an elongate handle is pivotably affixed to the latch mechanism about a first axis of rotation and is operative to move said latch mechanism from the engaged position to the released position as the handle is moved from a closed to an open position. The latch handle is lockable in the closed position by a manually operable handle catch. When the latch is mounted overhead and the latch is disengaged with the handle open, the handle extends downwardly away from the latch mechanism by the force of gravity and the cover extends downwardly away from the first end of the handle also by the force of gravity. The handle is spring-biased toward the open position.

The latch mechanism includes a frame member having a hook at one end for engaging an object such as a keeper pin, which occupies a mouth of the hook. The handle catch is spring-biased and is rotatably affixed to a sensor arm which in turn is rotatably affixed to the frame. The sensor arm is moved by objects that are placed into the hook mouth and is spring-biased toward the hook-unoccupied position. A portion of the sensor arm laterally covers the mouth of the hook and disables the operation of the handle catch when the hook is not occupied, thereby preventing the handle from being locked in the closed position unless the hook is occupied.

In one preferred embodiment, a handle cover is hingedly affixed at one end to the front end of the handle and is moveable between open and closed positions. A cover catch on an opposite end of the cover is engagable with the latch mechanism for releasably holding the cover closed. The cover is substantially coextensive with and in close abutment with the handle when the cover is in its closed position. The cover has a spring-biased trigger for releasing the cover from its closed position. The cover is rotatable about a second axis of rotation parallel to the axis of the handle joint and prevents access to the handle catch when the cover is closed. The cover catch is spring-biased and engageable with a toggle link of a toggle linkage of the latch mechanism. The cover catch, the handle and the frame member are constructed and arranged so that the cover cannot be closed when the handle is not first closed and the latch mechanism is fully engaged. The latch is stabilized when fully engaged by an over-center condition of the latch mechanism toggle linkage.

The novel latch provides a high degree of visibility if it unsecured. One major use of the latch is to fasten aircraft engine cowlings. Modern aircraft engines are very large and have minimal ground clearance. As a result, an unlatched or incompletely latched condition may not be easily seen during an inspection of the latch mounted on the bottom of the engine. If the novel latch is installed on the bottom of the engine and is not properly closed, the handle hangs down and the handle cover hangs down even farther. This construction makes it much easier to detect if the latch is not properly closed.

BRIEF DESCRIPTION OF THE DRAWINGS

FIGS. 5a through 5e depict a series of paired corresponding perspective and elevational views of another embodiment of the invention in various operational configurations;

DESCRIPTION OF THE PREFERRED EMBODIMENTS

Figure 1:
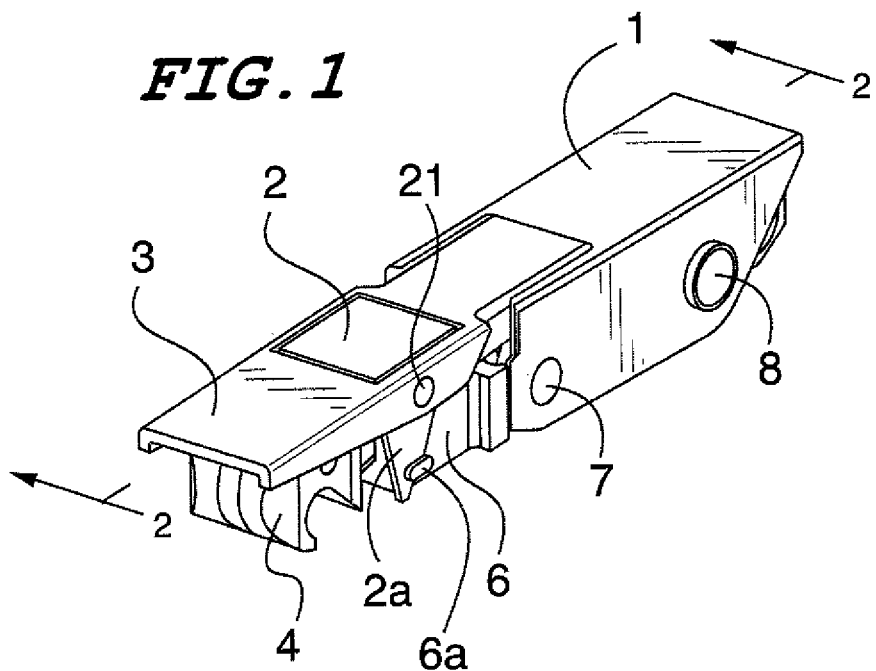
FIG. 1 is a top right front perspective view of one embodiment of the invention.
Figure 2:
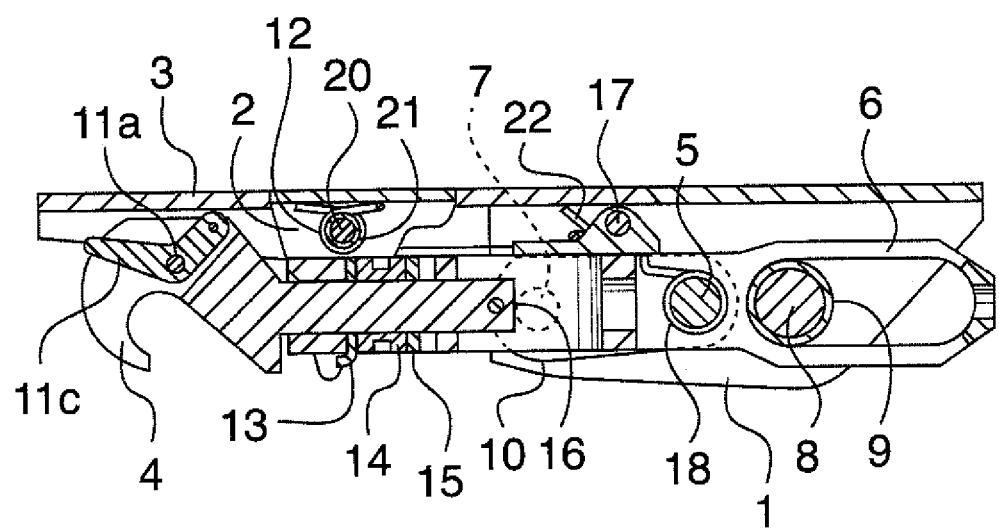
FIG. 2 is a cross-sectional view of the embodiment shown in FIG. 1.

A latch in accordance with one preferred embodiment of the invention is illustrated and described with respect to FIGS. 1-4. Referring first to FIGS. 1 and 2, the latch has a substantially-symmetrical construction about a longitudinal axis so features shown on one side apply equally to the opposite side. The latch generally includes an upper link 1, lower link 10, a handle 3, a hook 4, and additional linkage components that operably connect the handle 3 to the hook 4. As described in detail below, movement of the handle 3 extends and retracts the hook 4 between open and closed positions.

The upper link 1 is constructed of thin sheet metal and has side walls that surround other internal components of the latch to minimize the latch's overall volume and weight. The upper link 1 operably pivots about a mounting pin 8 that connects the latch to an associated fixed structure such as a portion of an aircraft (not shown). Rivets 7 straddle the front walls of the upper link and hingedly connects it to the front of a lower link 10, which nests inside a central channel of the upper link 1. The lower link 10 is also pivotally connected to an elongate latch arm 6 by a pin 5. The rear walls of the latch arm 6 include a pair of slots 6b in which the mounting pin 8 can translate. Each link includes a center channel between opposing thin sidewalls forming a U-shaped lateral cross section. When assembled, the body of the latch arm 6 nests within the lower link 10, which in turn nests within the upper link 1. This nested configuration provides a very compact device as better appreciated when viewing FIG. 3. This combination of elements forms the latch toggle linkage.

A handle 3 is rotatably connected to the lower link 10 and the upper link 1 by a pin 17, which carries a spring 22 that biases the handle upward away from the lower link 10 toward the open position of the latch. The location of the pin 17 permits a small amount of free travel of the handle. Likewise, another spring 18 biases the lower link upward away from the latch arm 6 to hold the latch open. The handle 3 actuates the latch between open and closed positions. After a limited amount of free movement restricted by the back end of the handle abutting the lower link 10, continued lifting of the handle 3 will lift the lower link upward, extending the hook and releasing the latch as best seen in FIGS. 5d and 5e.

As described above, the handle extends and retracts a latch arm 6 having hook 4 at the front end. The hook 4 engages and grabs a keeper (not shown) in the closed position and applies a tensile clinch load between the keeper and the latch mounting pin 8.

Figure 4:
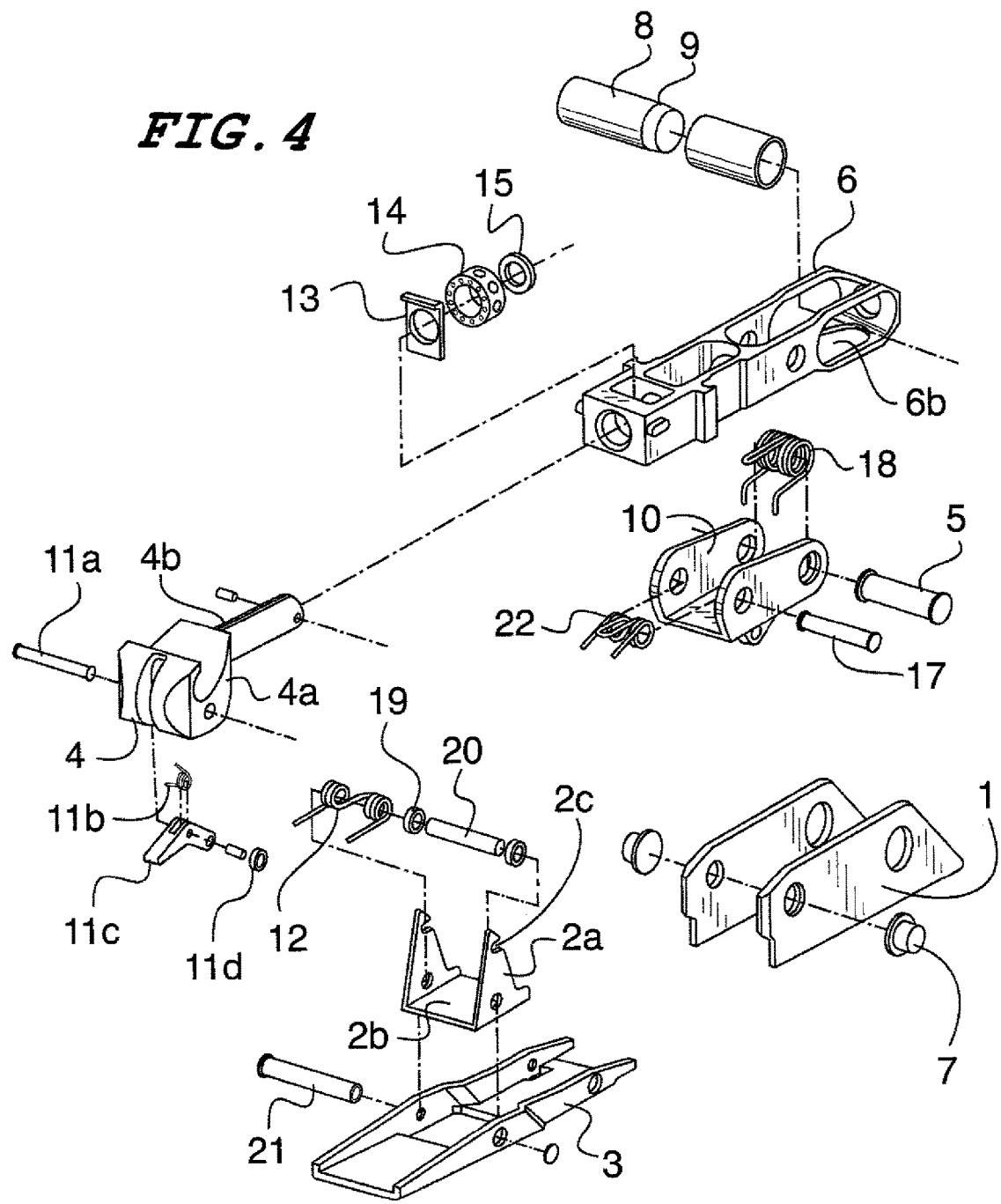
FIG. 4 is an exploded assembly view of the embodiment show in FIG. 1.

The handle 3 includes a trigger 2 that releasably locks the handle 3 in a closed position. The trigger 2 is pivotally attached to the handle 3 by a pin 20, which includes a concentric sleeve 21 about which the handle can pivot to a limited extent. The trigger 2 releasably holds the handle 3 down in the configuration shown in FIGS. 1 and 5a when the latch is locked. As best seen in FIG. 4, the trigger 2 has a generally-planar base 2b and two side arms 2a fixed at their proximal ends to and extending transversely from opposed sides of the base 2b. The distal end of each arm 2a includes a transverse slot 2c, which creases a barbed end. The slots 2c are shaped and located to engage a catch 6a on opposed sides of the latch arm 6. In this embodiment, the catches 6a comprise a small protuberance that extends from the side walls of the latch arm 6. The trigger 2 is spring loaded and the side arms 2a include barbed ends, which bear against the catches 6a as the handle 3 is closed. This action ensures that the slots 2c capture the catches 6a to provide a self-actuating effect when the handle 3 is pushed fully closed.

An exploded view of the latch arm 6, and the other latch components, is shown in FIG. 4 from a bottom perspective. The latch arm 6 is arranged in fixed connection to a hook 4 at the front end and in translating connection to the mounting pin at the rear end. The mounting pin 8 is surrounded by a bushing 9 received through a pair of longitudinally-extending slots 6b in the side walls of the latch arm 6. The hook assembly 4 consists of hook-shaped head 4a and a cylindrical mount 4b, which is constructed to cooperatively engage and connect to a yoke in the front of the latch arm 6. A nut 14, nut plate 13, spring 15 and stop pin 16 connect the hook 4 to the yoke.

The trigger 2 is connected to the handle 3 by a pin 20. Another spring 12 biases the trigger 2 upwardly so that its top surface is flush with the top of the handle 3 when the latch is closed and locked as shown in FIG. 1. Each side arm 2a of the trigger 2 has a slot which engages the locking catch 6a protruding from the sides of the latch arm 6 as seen in FIG. 1 and as described above.

The various components discussed above are shown assembled and in the locked position viewed from the side and the top in FIG. 2. In a preferred embodiment, the hook 4 includes means for detecting whether or not the hook is engaged with the keeper. In one embodiment, the detecting means 11 is fixed to the head 4a as best seen in FIG. 4. The detecting means includes a sensor lever 11c having one arm that is biased downward into the mouth of the hook 4. When the keeper (not shown) properly occupies the hook 4, a first lever arm is pushed upwardly against the bias of a spring 11b into the position shown in this FIG. 2. Otherwise, when the mouth of the hook 4 is unoccupied, the first lever arm will point downwardly and a second lever arm will then point upwardly and make contact with the handle 3 to stop the handle 3 from fully closing. Thus, the detecting means prevents the latch 3 from closing if the hook is not properly engaged with the keeper.

Figure 3:
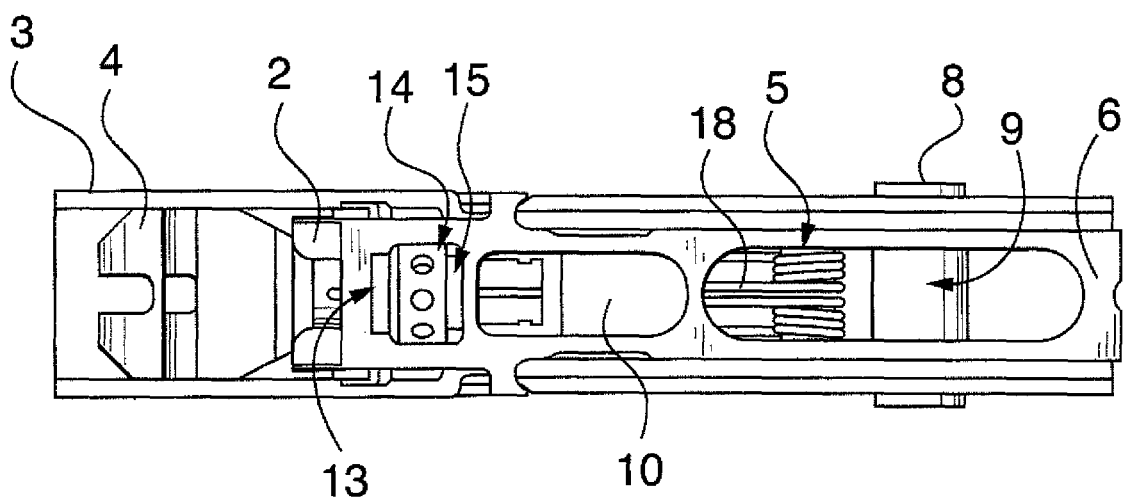
FIG. 3 is a bottom plan view of the embodiment shown in FIG. 1.

The compact design of the latch is best illustrated in FIG. 3. The major components, including the upper link 1, the lower link 10, the latch arm 6, and the handle 3 all nest with one another more or less when the latch is closed. As shown in FIG. 4, the upper link 1 has U-shaped central channel with sidewalls that surrounds the lower link 10 and part of the handle 3. The lower link 10 likewise has a channel that surrounds a portion of the latch arm 6. In addition, the upper link 1 surrounds a portion of the handle 3. As depicted in FIG. 3, the relatively thin sidewalls of the links provide a minimal lateral dimension of the latch. The length of the latch is also minimized by the toggle linkage because the toggle links fold together rather than spread apart as leverage is applied to the hook when it is being closed. This feature is illustrated in reverse order in the opening sequence of FIGS. 5a through 5e. The construction of the toggle linkage provides an over-center alignment of the link joints so that a portion of the applied load is transmitted through the linkage to forcibly hold the latch in a stable closed condition.

FIGS. 5a through 5e depict a sequence of configurations of the latch as it transitions from fully closed to fully open. A top perspective view of the latch is shown on the left of each Figure. On the right of each Figure, the latch is shown in the same configuration as on the left but in an upside-down, side-elevational view, which is a typical in an aircraft application where the latch swings in the vertical plane. Operation of the keeper detecting means 11 is not shown since the associated mating keeper is not depicted here.

In FIG. 5a, the latch is shown properly closed and secured. A portion of the load applied between the hook and the mounting pin 8 holds the latch closed by virtue of an over-center alignment of the linkage joints. In FIG. 5b, the latch is shown immediately after the trigger 2 has been depressed to release the handle from the locked position. Initial depression of the trigger rotates the side arms 2a out of engagement with the catches 6a on latch arm 6.

In FIG. 5c, the latch is shown after gravity and the spring has urged the handle 3 outward to the extent of its free travel on the lower link. At this location, a back end of the handle contacts the top of the lower link. In this configuration with the handle popped outward, the handle can be easily grasped to open the latch.

In FIG. 5d, the latch is shown after the handle has been pulled open, which extends the hook to its maximum reach or take-up position. FIG. 5d illustrates the nesting of the links 1 and 10 together with the handle 3 as well as disengagement of the side arm 2a from the catches 6a.

FIG. 5e depicts the maximum reach position of the hook 4, which corresponds to a release position of the hook 4 from a keeper. A spring biases the lower link away from the hook 4 to hold the latch fully opened. With the keeper released, the latch arm rotates about the mounting pin 8, which allows the hook 4 to hang down away from the keeper (to the extent allowed by surrounding structures) because the center of gravity of the latch is in front of the mounting pin 8.

With the operational explanation of FIGS. 5a through 5e taken together with the explanation of FIGS. 1 through 4, a full understanding of the invention will have been appreciated by one of skill in the mechanical arts. It will be readily apparent that the objects of the invention have been achieved by providing a light-weight latch with an extremely small kinematic envelope while allowing adequate reach and closing leverage. Furthermore, the objective of providing a lever latch that is protective of surrounding structures has also been achieved.

A latch 111 in accordance with another preferred embodiment of the invention is illustrated and described in FIGS. 6-11. The latch 111 has a substantially-symmetrical construction about a longitudinal axis so features shown on one side apply equally to the opposite side.

Figure 6:
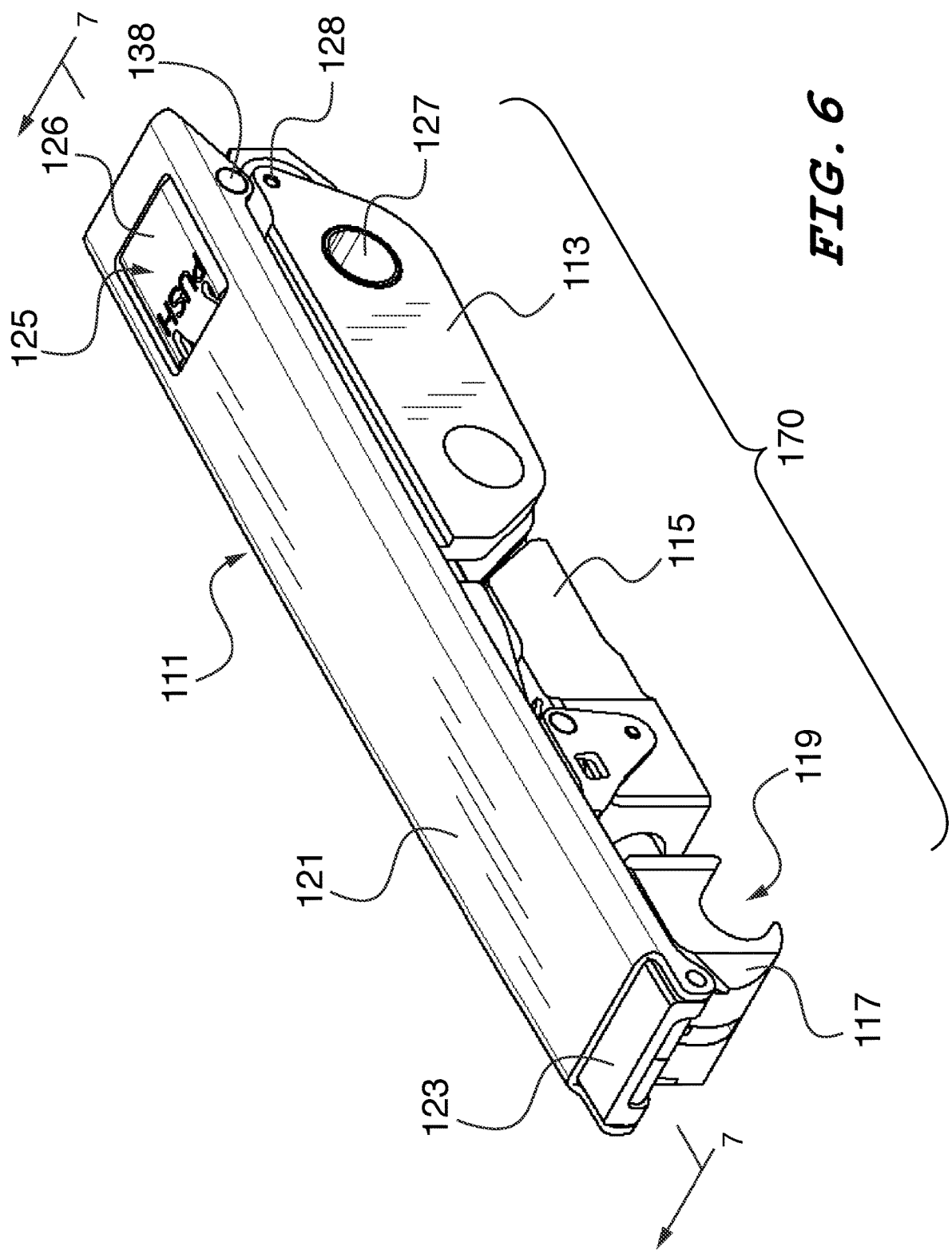
FIG. 6 is a top right front perspective view of a latch in accordance with a preferred embodiment of the invention.

Referring to FIG. 6, the latch 111 is shown in the closed position. The latch 111 generally comprises a tension latch mechanism, designated generally by reference numeral 170, a handle 123 connected the latch mechanism 170, and a cover 121 connected to the handle 123. In a preferred embodiment the latch mechanism 170 includes a frame member 115, a toggle linkage 113 connected to a first (rear) end of the frame, and a hook 117 connected to a second (front) end of the frame. A first (rear) end of the handle 123 is pivotally connected to the linkage 113. A second (front) end of the handle 123 is pivotally connected to the cover 121. As described in detail below, movement of the handle 123 extends and retracts the hook 117 between open and closed positions. The linkage 113 is structurally and functionally similar to the linkage of the latch described above with respect to FIGS. 1-6.

Figure 11:
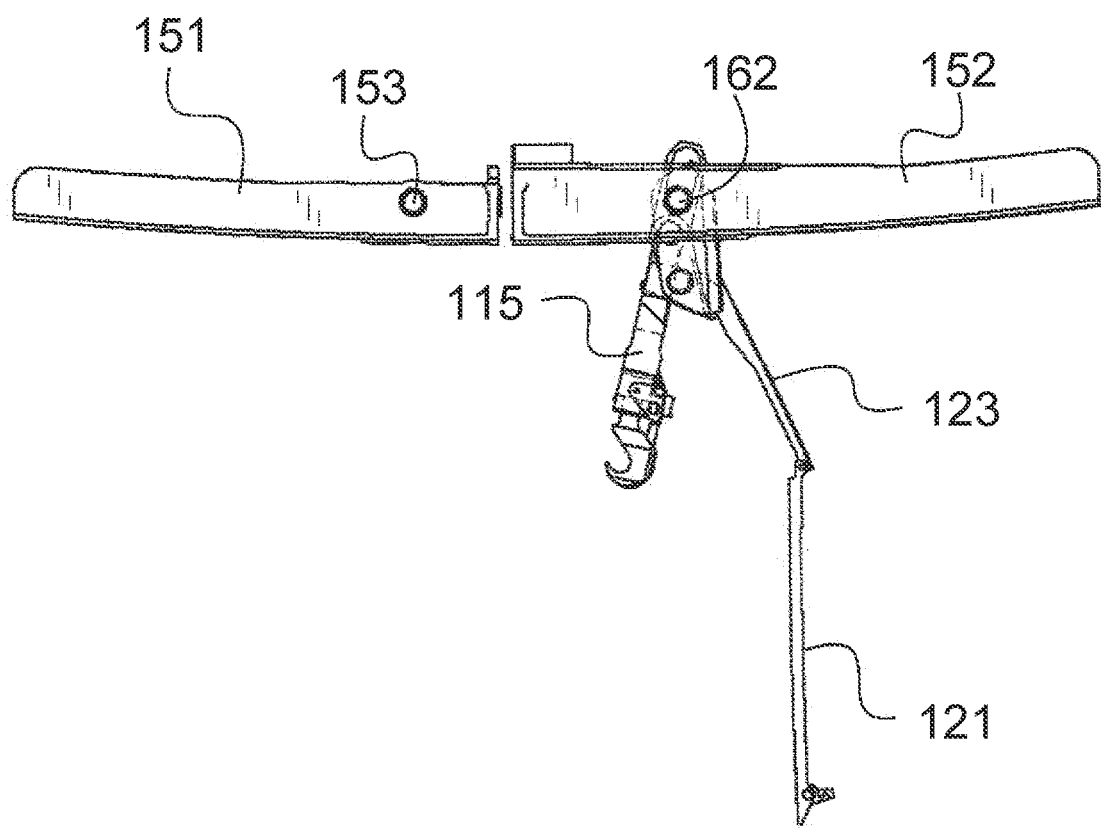
FIG. 11 is a left side elevation showing the latch of FIG. 6 in the open position and affixed to a portion of an aircraft adjacent a fan cowl housing.

As best seen in FIG. 11, the latch 111 connects to a fixed portion of the aircraft 152 by a mounting pin 162, which extends through a mounting pin bushing 127. The latch 111 provides tension engagement between the mounting pin 162 and a second element such as a keeper 153, which is fixed to a movable portion 151 of the aircraft. In a preferred embodiment, the keeper 153 engages and sits in the mouth 119 of the hook 117.

Figure 8:
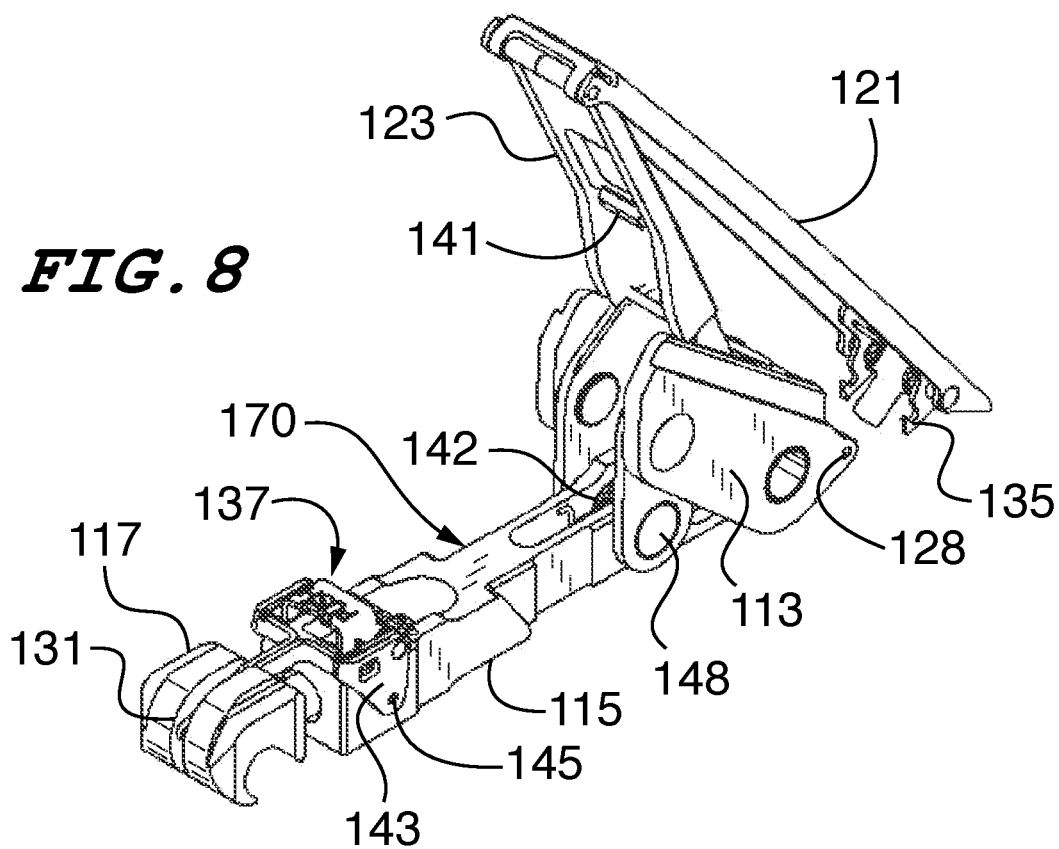
FIG. 8 is a top right perspective view of the latch of FIG. 6 shown in the open position.
Figure 9:
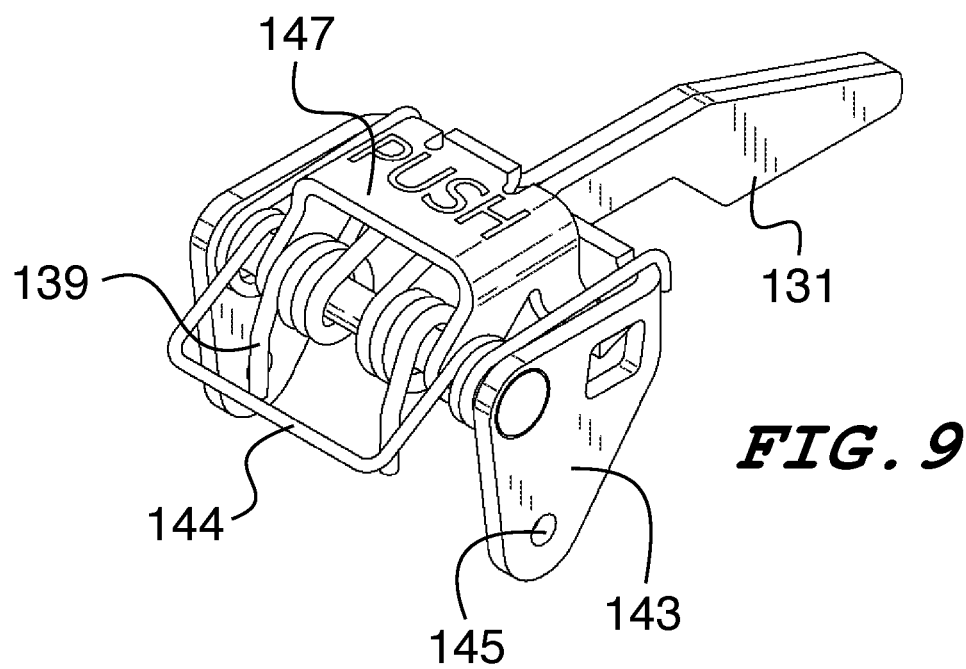
FIG. 9 is a top rear perspective view of the handle latch and hook sensor assembly of the latch of FIG. 6.

A handle cover 121 is pivotally connected to the front end of the handle 123 as best seen in FIG. 8. The cover 121 nests in close abutment with the handle 123 when the latch 111 is closed as seen in FIG. 6. In one preferred embodiment, the cover 121 is held closed by a cover catch 125 located proximate the back end of the handle 123. The cover catch 125 is pivotally connected to the cover 121 by a pivot pin 138. The catch 125 includes barbed hooks 135 that releasably engage catch pins 128 on the inside of the toggle linkage 113 as best seen in FIG. 8. The top of the catch 125 includes a trigger portion 126 that lies substantially flush with the top of the cover 121 when the latch 111 is closed as shown in FIG. 6.

Figure 7:
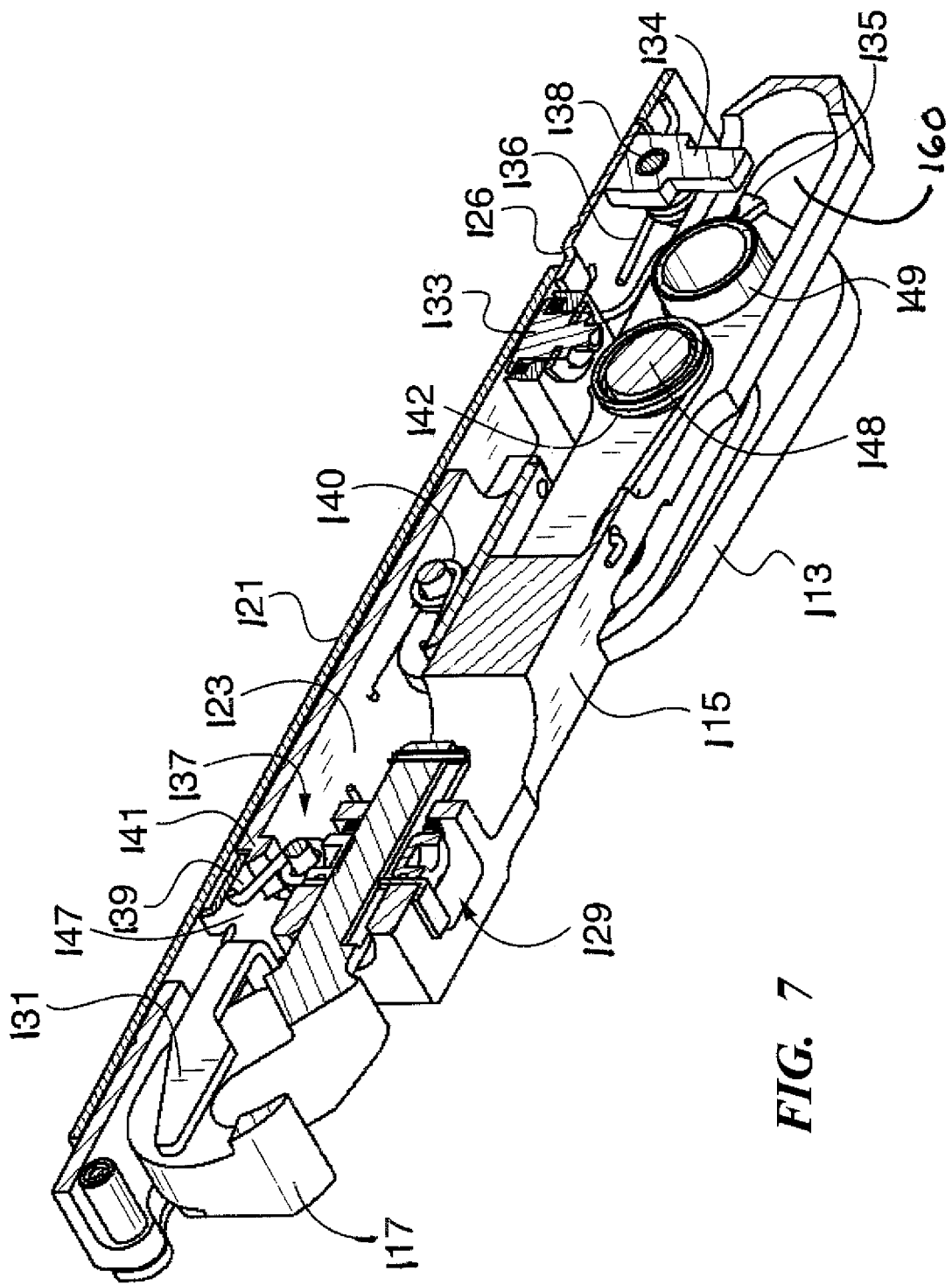
FIG. 7 is bottom right cross-sectional, perspective view of the latch of FIG. 6.

FIG. 7 shows the underside of the cover catch 125 at the rear of the latch 111. The catch trigger 126 is biased toward its home position by a spring 136. A plunger spring assembly 133 biases the cover away from the toggle linkage 113. A rubber bumper 134 is attached to the pivot pin 138. The bumper 134 protects surrounding objects and the catch 125 from impact when the latch 111 swings open.

Referring to FIG. 7, the latch 111 is connected to a static structure by a mounting pin 162 (shown in FIG. 11 that extends through the mounting bushing 149. Linear, axial movement of the frame 115 and hence hook 117 relative to the mounting pin 162 is enabled by a slot 160 at the rear of the frame 115. One end of a handle 123 is affixed to the linkage 113, which is affixed to the frame at joint 148. The other end of the handle 123 is fixed to the cover 121. The linkage 113 includes a main spring 142 that biases the linkage 113 toward the released position. The handle 123 is biased toward the open position by a spring 40. The latch 111 is stabilized in the closed and engaged position by an over-center condition of the toggle linkage 113.

Referring to FIG. 7, the frame 115 includes a hook-length adjustment mechanism 129, which adjusts the "throw" of the hook, i.e., the length of the projection of the hook 117 from the frame 115 in the extended position. The adjustment mechanism 129 also adjusts the length of the projection of the hook 117 from the frame 115 in the retracted position. Thus, the adjustment mechanism 129 enables the latch to be used in a variety of applications where the distance between the mounting pin 151 and the keeper 153 is different. Furthermore, by adjusting the throw of the latch for a given distance between the mounting pin 151 and the keeper 153, the tensile load applied by the latch can also be increased or decreased depending on the application.

In a preferred embodiment, the latch 111 includes means for detecting whether or not the hook 117 is engaged with the keeper 153. The frame 115 has a hook sensing means that detects whether the keeper 153 occupies the mouth 119 of the hook 117. In one preferred embodiment, the detecting means includes a sensor arm 131 that is normally biased downwardly by a hairspring 144 into the mouth 119 of the hook 131. The hairspring 144 acts against the frame 115. The sensor arm 131 is rotatably mounted to the fame 115 by a bracket 43 best seen in FIGS. 9 and 10. The bracket 143 is rotatably mounted on the frame 115 at a joint 145. When the keeper (not shown) properly occupies the mouth 119 of the hook 117, the sensor arm 131 is pushed upwardly against the bias of a spring 144 to the position shown in FIG. 7. In FIG. 7, the sensor arm 131 is shown in a retracted position as if the keeper 153 occupied the mouth 119; however, the keeper 153 is not shown. Normally, the keeper 153 contacts and urges the arm 131 into the position shown in FIG. 7. Otherwise, when the hook 117 is unoccupied, the sensor arm is biased into the mouth 119 of the hook 117.

FIGS. 7 and 8 show the cover 121 closely abutting and covering the handle 123. A handle trigger assembly 137 releasably holds the handle 121 in this orientation. The handle trigger assembly 137 is shown in more detail in FIGS. 9 and 10. The trigger assembly 137 generally comprises a trigger 147, which is rotatably mounted on the bracket 143. the trigger 147 is visible and accessible through a window in handle 123. A hairspring 139 biases the trigger upward to a home position. The trigger 147 is constructed and arranged to releasably engage (at the back edge) a lip 141 on the underside of the handle 123. When engaged with the lip 141, the trigger assembly holds the handle 123 closed. When the trigger 147 is depressed, it disengages with the lip 141 and releases the cover 121.

Referring to FIG. 8, the latch 111 is shown in the open position when not mounted overhead. The latch 111 is biased to this position by a main spring 142, which acts between the frame 115 and the toggle linkage 113. The free end of the cover releasably connects to the linkage 113 by way of the catch 125. Since the cover 121 moves with the handle 123, when the handle is open, the cover 121 cannot be closed against the handle because the catch hooks 135 are moved rearward and cannot engage the catch pins 128. As a result, when the handle 123 is open, the cover 121 must also be open. This feature facilitates the high visibility function of the latch, especially when the latch is mounted overhead as shown in FIG. 6.

In one embodiment, the detecting means 11 is fixed to the head 4a as best seen in FIG. 4. Otherwise, when the mouth of the hook 4 is unoccupied, the first lever arm will point downwardly and a second lever arm will then point upwardly and make contact with the handle 3 to stop the handle 3 from fully closing. Thus, the detecting means prevents the latch 3 from closing if the hook is not properly engaged with the keeper.

The elements of the latch are constructed and arranged so that the handle 121 cannot close when the hook 117 is unoccupied because the handle trigger moves with the sensor since it is mounted on the sensor bracket 143. When the sensor arm 131 is rotated into the hook mouth by the spring 144, the engagement edge of the trigger 147 moves forward with it away from its engagement position with the handle catch lip 141. This movement disables the handle catch and the handle then freely moves away from the latch mechanism by action of the handle spring 140. When mounted overhead, the latch has the orientation shown in FIG. 6, which very visibly alerts inspectors that the keeper has not been engaged and that an unsafe condition exists.

Figure 10:
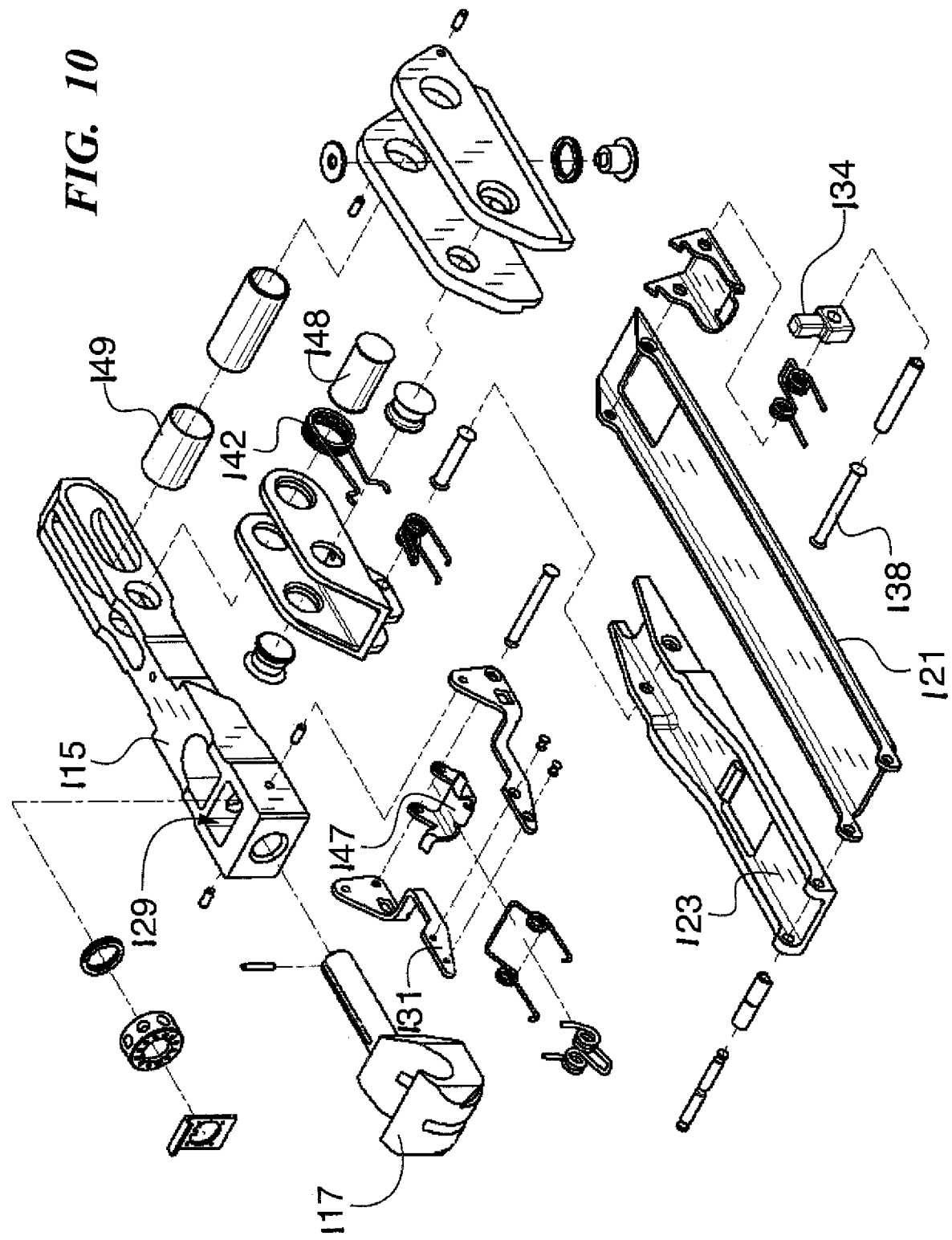
FIG. 10 is an exploded assembly view of the latch of FIG. 6.

Referring now to FIG. 10, an exploded assembly view shows all of the individual parts of one preferred embodiment for a complete explanation of how this embodiment of the invention is constructed. The correspondence between the parts in this Figure and the parts shown in FIGS. 7-10 will be readily apparent to those of skill in the art without the need for repetitive numbering.

Referring now to FIG. 6, a preferred embodiment is depicted installed overhead on an aircraft for joining panels 51 and 52 with the latch released. The movable panel 51 may be, for example, a moveable engine fan cowl housing which includes a keeper 53 while the stationary panel 52 may be a fixed part of the engine. The latch is affixed to the stationary panel 52 by a mounting pin 162 that extends through bushing 27. Because the mounting pin 162 is located at the back end of the latch, the frame 115 and hook 117 hang downwardly by the force of gravity safely away from the engine components. In this orientation, the handle 123 and cover 121 together hang down even farther than the hook 117 at the end of the latch. This construction makes the open latch more visible to maintenance personnel when the bottom of the engine is close to the ground.

The foregoing drawings and descriptions are to be considered illustrative only of the principles and possible embodiments of the invention. Further, since numerous modifications and changes will readily occur to those skilled in the art, it is not desired to limit the invention to the exact constructions and operations shown and described. Accordingly, suitable modifications and equivalents may be resorted to, all falling within the scope of the invention, which shall be determined only by the following claims and their legal equivalents.

The invention claimed is:

1. A latch for connecting a first static structural element to a keeper on a second, movable structural element, comprising:
   a tension latch mechanism having an elongate frame member, mounting means at a rear end of said frame member for pivotal connection with a mounting pin on the first structural element, and a hook connected to a front end of the frame member, said hook having a mouth for releaseable engagement with the keeper, said tension latch mechanism being operable between engaged and released positions;
   an elongate handle pivotably affixed to the frame member about a first axis of rotation at a rear end of the handle and operative to move said latch mechanism from the engaged position to the released position of the latch as the handle is moved from a closed to an open position;
   a handle cover pivotably affixed at one end to a front end of the handle and moveable between open and closed positions;
   a cover catch on an opposite end of the cover for releasably holding the cover closed, and,
   a sensor arm positioned in the mouth of the hook when the hook is not occupied, said sensor arm affixed to the handle catch such that the handle catch is disengaged when the hook is not occupied thereby preventing the handle from being held in the closed position by the handle catch,
   wherein the center of gravity of the latch is located forward of the mounting means so that when the latch is mounted overhead and the hook is disengaged from the keeper with the handle in the open position, the tension latch mechanism rotates about the mounting pin until both the tension latch mechanism and handle extend substantially downwardly and the cover extends substantially downwardly from the first end of the handle by the force of gravity; and,
   wherein the sensor arm is rotatably affixed to the frame member.

2. The latch of claim 1 wherein said cover is substantially coextensive and in abutment with a top of the handle when the cover is closed.

3. The latch of claim 1 wherein the cover catch is resiliently biased and has a manually operable trigger portion.

4. The latch of claim 1 wherein the handle is releaseably held in the closed position by a handle catch.

5. The latch of claim 4 wherein the handle catch is operable by a trigger portion that is flush with the top of the handle.

6. The latch of claim 1 wherein the cover is rotatable about a second axis of rotation parallel to the first axis of rotation.

7. The latch of claim 1 wherein the handle is spring-biased toward the open position.

8. The latch of claim 1 wherein the handle catch is rotatably affixed to the sensor arm.

9. The latch of claim 1 wherein the cover catch has catch hooks that are releaseably engageable with catch pins on the latch mechanism and wherein by movement with the position of the handle the hooks are prevented from engaging the pins when the handle is open such that the cover catch is not engageable when the handle is not closed.

10. The latch of claim 1 wherein the cover catch, the handle and the frame member are constructed and arranged so that the cover catch is disabled when the handle is not closed and prevents the cover from being held closed by the cover catch when the handle is not closed.

11. The latch of claim 1 wherein the sensor arm is spring-biased toward a position where the sensor arm is positioned in the mouth of the hook.

12. The latch of claim 1 wherein the cover is spring-biased toward its open position and the cover catch is spring-biased toward a home position flush with the cover.

13. The latch of claim 1 wherein the handle catch is spring-biased against the sensor arm toward a home position on the arm.

14. The latch of claim 1 wherein the latch mechanism comprises a toggle linkage.

15. The latch of claim 14 wherein the wherein the latch is stabilized in the engaged position by an over-center condition of the linkage.

16. A latch for connecting a first static structural element to a keeper on a second, movable structural element, comprising:
   a tension latch mechanism having a frame member, mounting means at a rear end of said frame member for pivotal connection with a mounting pin on the first structural element, and a hook connected to a front end of the frame member, said hook having a mouth for releaseable engagement with the keeper, said tension latch mechanism being operable between engaged and released positions;
   an elongate handle pivotably affixed to the tension latch mechanism about a first axis of rotation at a rear end of the handle and operative to move said latch mechanism from the engaged position to the released position of the latch as the handle is moved from a closed to an open position;
   a handle cover pivotably affixed at one end to a front end of the handle and moveable between open and closed positions;
   a cover catch on an opposite end of the cover for releasably holding the cover closed; and, a sensor arm positioned in the mouth of the hook when the hook is not occupied, said arm affixed to the handle catch such that the handle catch is disengaged when the hook is not occupied thereby preventing the handle from being held in the closed position by the handle catch wherein the sensor arm is rotatably affixed to the frame member.

17. The latch of claim 16 wherein the handle catch is rotatably affixed to the sensor arm.

18. The latch of claim 16 wherein the sensor arm is spring-biased toward a position where the sensor arm is positioned in the mouth of the hook.

19. The latch of claim 16 wherein the handle catch is spring-biased against the sensor arm toward a home position on the arm.

* * * * *